UNITED STATES PATENT OFFICE.

ADOLF STREBEL, OF FRANKFORT-ON-THE-MAIN, GERMANY, ASSIGNOR, BY MESNE ASSIGNMENTS, TO THE FIRM OF HAARMANN & REIMER CHEMISCHE FABRIK ZU HOLZMINDEN, G. M. B. H., OF HOLZMINDEN, GERMANY.

PROCESS OF MAKING IONONE.

SPECIFICATION forming part of Letters Patent No. 715,896, dated December 16, 1902.

Application filed November 14, 1898. Serial No. 696,443. (Specimens.)

*To all whom it may concern:*

Be it known that I, ADOLF STREBEL, a subject of the Emperor of Germany, and a resident of Frankfort-on-the-Main, Germany, (assignor to the firm of HAARMANN & REIMER, in the city of Holzminden, Germany,) have invented certain new and useful Improvements in Chemical Compounds, of which the following is a specification.

According to the method of the United States Patent No. 556,943, dated March 24, 1896, alkaline agents condense citral with acetone forming pseudoionone, the latter being converted into the isomeric ionone by the action of acids. Theoretically it should be possible to produce ionone by first preparing cyclocitral and condensing this with acetone to ionone, using alkaline agents according to known methods. I have found and proved that this method also is practicable and that in order to obtain a crude cyclocitral suitable for the preparation of ionone in the manner described the following method may be used: Citral is condensed with cyanacetic acid or one of its salts or ethers, yielding citralidenecyanacetic acid or a derivative of this compound. The citralidenecyanacetic acid or its derivative is then converted into the corresponding isomeric cyclic compound by the method described in the United States Patent No. 556,944, dated March 24, 1896, and the crude product thus obtained is treated at a sufficiently-high temperature with caustic alkali alone or in presence of a gentle oxidizing agent, such as manganese peroxid, which liberates an oily substance containing cyclocitral. This oil is either submitted directly to alkaline condensation with acetone, or after fractional distillation the portion of crude cyclocitral which boils at 80° to 110° under a pressure of twelve millimeters is treated in this manner. The ionone thus produced is submitted to fractional distillation and further purified by known methods.

The purified cyclocitral is a clear liquid aldehyde represented by the formula $C_{10}H_{16}O$ and has a specific gravity of 0.94 to 0.96.

The details of procedure are demonstrated in the following examples:

Example I: One hundred parts of cyanacetic acid dissolved in three hundred parts of water are treated with a solution of eighty parts of caustic soda in two hundred parts of water and subsequently with a mixture of one hundred and eighty parts of citral and one hundred parts of alcohol. The liquid, which is turbid in the beginning, becomes clear when agitated for a short period, its temperature rising simultaneously. On acidification citralidenecyanacetic acid separates first as an oil, which gradually solidifies in crystalline form. It can be used without further purification. The solidified citralidenecyanacetic acid is obtained on recrystallization from a cold mixture of benzene and petroleum spirit in white crystals melting at 121° to 122°.

Example II: The crude solidified citralidenecyanacetic acid is converted into the corresponding cyclic isomerid on being boiled in a reflux apparatus during about twelve hours with a solution of eighty parts, by volume, of concentrated sulfuric acid in six hundred parts, by volume, of water. The neutral by-products which are formed at the same time are separated by dissolving the crude acid in caustic alkali and extracting the alkaline solution with ether. The cyclic citralidenecyanacetic acid precipitated from the alkaline liquid by acids forms a viscous syrup and has not been hitherto obtained in a crystalline form. In order to split off cyclocitral from the cyclocitralidenecyanacetic acid, the crude acid obtained from one hundred and eighty parts of citral is dissolved in a small quantity of caustic alkali and treated with a powerful current of steam in a distillation apparatus, two hundred parts of caustic potash dissolved in a small quantity of water being allowed to drop into the liquid meanwhile. The oil which distils over contains the cyclocitral which is formed. The fraction of this oil, which boils at 60° to 110° under a pressure of twelve millimeters, is a yellowish liquid rich in cyclocitral, as has been proved by its conversion into ionone. The separation of cyclocitral from cyclocitralidenecyanacetic acid can be also effected by boiling the cyclocitralidenecyanacetic acid obtained from one hundred and eighty parts of citral with a solution of two hundred parts of caustic potash in three hundred parts of water and three hundred parts of xylene for ten to twelve hours in a reflux apparatus, the layer of xylene being collected, dried, and fractionated under reduced pressure, when the fraction which boils at 60° to 110° under a pressure of twelve millimeters is collected as cyclocitral.

In order to facilitate the splitting off of cyclocitral, a small quantity of a gentle oxidizing agent—such as lead peroxid, manganese peroxid, barium peroxid, or sodium peroxid, &c.—may be used in both cases.

Example III: The condensation of cyclocitral with acetone to ionone may be effected with almost the same result by different alkaline agents. A good result is obtained, for instance, by adding a solution of five parts of sodium in a small quantity of alcohol to a mixture of fifty parts of crude cyclocitral and one hundred parts of acetone and allowing the clear liquid to remain for about three hours at ordinary temperatures. The product is neutralized with tartaric or another acid. The ionone thus set free is distilled in a strong current of steam and submitted to fractional distillation under reduced pressure, the fraction, which boils at 130° to 140° under a pressure of sixteen millimeters, being collected as ionone.

The ionone when sufficiently purified by fractionation has the specific gravity 0.9435 at 21° and is rich in the modification of ionone described as $\beta$-ionone.

When treated with an alcoholic solution of of semicarbazide hydrochlorid in aqueous sodium acetate, the ionone prepared from cyclocitral yields a considerable proportion of $\beta$-ionone semicarbazone, melting 148°. Ionone set free in the usual way from the crystallized semicarbazone yields the parabromophenylhydrazone, melting at 116°, which is characteristic for $\beta$-ionone when treated with parabromophenyl-hydrazin dissolved in acetic acid.

I claim—

1. The herein-described process of making ionone which consists in reacting on citral with cyanacetic acid in the presence of free alkali in solution, thereby obtaining crude citralidene cyanacetic acid, converting the citralidenecyanacetic acid into the cyclic isomerid by treatment with concentrated acids, separating cyclocitral therefrom, dissolving it in alkaline-alcoholate and acetone and distilling off the ionone as set forth.

2. The herein-described process of obtaining ionone, which consists in condensing citral with a cyanacetic substance converting the product into the isomeric cyclic compound, splitting off cyclocitral, and subjecting the product to alkaline condensation with acetone.

3. The herein-described process of obtaining a citralidenecyanacetic compound capable of forming cyclic compounds in the manufacture of ionone, which consists in condensing citral with a cyanacetic substance by means of an alkaline agent.

4. The herein-described process of obtaining cyclocitral which consists in converting citralidenecyanacetic acid into the cyclic isomerid by treatment with concentrated sulfuric acid, and subjecting the product at substantially the temperature of steam to the action of caustic alkali, preferably with the addition of a gentle oxidizing agent.

5. The herein-described process of obtaining ionone which consists in treating a mixture of cyclocitral and acetone with an alkaline agent.

6. The herein-described process of obtaining ionone which consists in adding an alcoholic solution of sodium to a mixture of cyclocitral and acetone, and neutralizing the product with an acid.

7. The herein-described cyclocitral, as an intermediate product in the manufacture of ionone, obtained from isomeric citralidenecyanacetic acid as a yellowish liquid boiling at 60° to 110° under a pressure of twelve millimeters.

In testimony whereof I have signed my name to this specification in the presence of two subscribing witnesses.

ADOLF STREBEL.

Witnesses:
MICHAEL VOLK,
CHAS. PIXIS.